United States Patent [19]

Horner et al.

[11] 4,193,314
[45] Mar. 18, 1980

[54] TIMING CHAIN SNUBBER

[75] Inventors: Thomas G. Horner, Royal Oak; Robert A. Ellis, Birmingham, both of Mich.

[73] Assignee: General Motors Corporation, Detroit, Mich.

[21] Appl. No.: 889,133

[22] Filed: Mar. 22, 1978

[51] Int. Cl.² ............................................... F16H 7/18
[52] U.S. Cl. ................................. 74/242.5; 123/198 E
[58] Field of Search ...................... 74/240, 241, 242.5; 198/841; 123/198 E

[56] References Cited

U.S. PATENT DOCUMENTS

| 414,774 | 11/1889 | Merrell | 74/240 |
| 2,101,172 | 12/1937 | Gegenheimer | 74/240 |
| 2,261,316 | 11/1941 | Weller | 74/242.11 |
| 2,526,173 | 10/1950 | Thomassin | 74/240 |
| 2,601,789 | 7/1952 | Riopelle | 74/240 |
| 2,766,634 | 10/1956 | Frank | 74/240 |
| 3,964,331 | 6/1976 | Oldfield | 74/242.1 FP |

FOREIGN PATENT DOCUMENTS 1036596 8/1958 Fed. Rep. of Germany ............. 74/240

OTHER PUBLICATIONS

MTD Products, Inc., Service Manual for Model No. 315-100A.

*Primary Examiner*—C. J. Husar
*Assistant Examiner*—Conrad Berman
*Attorney, Agent, or Firm*—Robert J. Outland

[57] ABSTRACT

An engine timing chain snubber comprises a pair of guide shoes fixedly supported on the engine block and extending in line-to-line nondeflecting contact with the inner sides of unsupported chain portions between drive and driven sprockets. The guide shoes prevent movement of the chain runs inwardly of their tensioned positions and thus prevent chain oscillation or vibration.

4 Claims, 4 Drawing Figures

U.S. Patent
Mar. 18, 1980
4,193,314
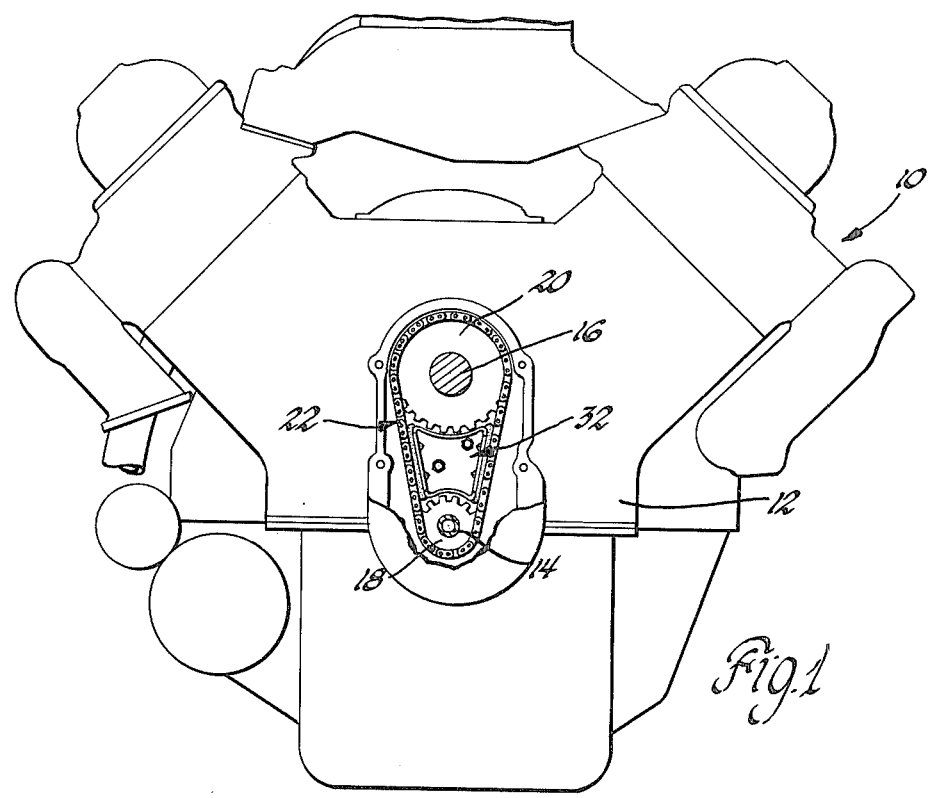
Fig.1
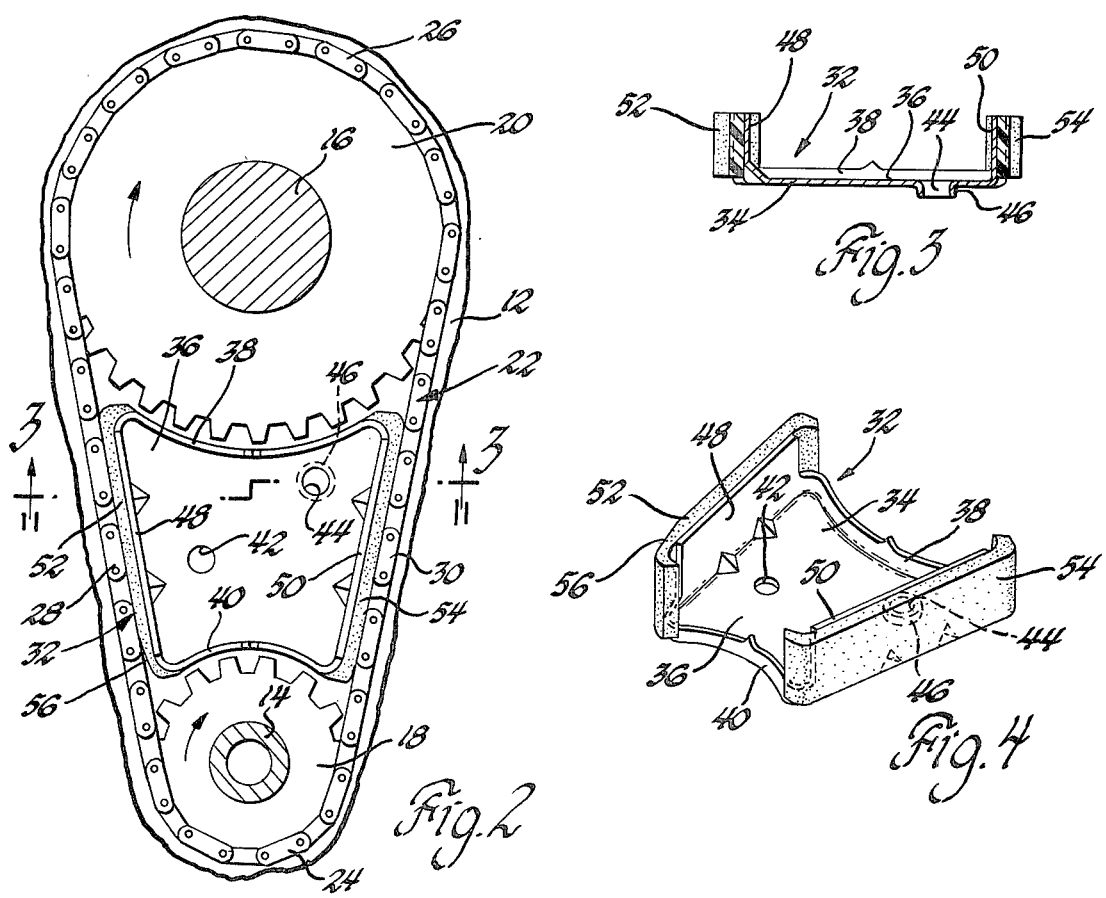
Fig.2
Fig.3
Fig.4

TIMING CHAIN SNUBBER

BACKGROUND OF THE INVENTION

It is well known in the art to utilize a chain, either of the link or silent type, to connect sprockets on the crankshaft and camshaft of an engine to drive the camshaft and its associated valve gear. In many such applications it has been found desirable to prevent or damp out vibrations in the chain runs, the unsupported portions between the sprockets, by providing some sort of snubbing or tensioning arrangement. Known arrangements include systems wherein a movable shoe is yieldingly urged into engagement with the slack side of the chain. In some cases, a fixed snubbing shoe is also provided in position to contact the tensioned or driving side of the chain. Such arrangements have been effective in snubbing chain vibrations and taking up slack that may exist or develop in the timing chain; however, such arrangements apply some load to the chain which is in turn added to the load already carried by the sprockets in driving the camshaft. This loading of the chain increases the driving forces and may noticeably increase wear on the sprockets, as well as the tensioning device itself. In addition, such snubbing arrangements may be complex and involve substantial cost to manufacture, install and maintain.

SUMMARY OF THE INVENTION

The present invention provides a simplified engine timing chain snubber which is relatively inexpensive to manufacture and install, is less subject to wear than conventional arrangements and accomplishes the purpose of preventing chain vibration without loading the chain so as to contribute to chain or sprocket wear. These and other features of the invention will be more fully understood from the following description of a preferred embodiment taken together with the accompanying drawing.

BRIEF DESCRIPTION OF THE DRAWING

In the drawing:

FIG. 1 is a front elevational view of an internal combustion engine having the timing chain cover removed to show a timing chain and snubber arrangement in accordance with the present invention;

FIG. 2 is an enlarged view of the timing chain and snubber arrangement of FIG. 1;

FIG. 3 is a cross-sectional view through the snubber member taken in the plane generally indicated by the line 3—3 of FIG. 2; and FIG. 4 is a pictorial view of the snubber member shown in FIGS. 1-3.

DESCRIPTION OF THE ILLUSTRATED EMBODIMENT

In the drawing, numeral 10 generally indicates an internal combustion engine of largely conventional construction and having a frame or cylinder block 12 in which are rotatably supported in spaced parallel relation a crankshaft 14 and a camshaft 16. Sprockets 18 and 20 are provided on the ends of the crankshaft and camshaft, respectively, and are engaged by a timing chain 22 which drivingly interconnects the crankshaft 14 with the camshaft and relates them in predetermined fashion so that in a four-stroke cycle engine of the type shown, the camshaft rotates at a speed one-half the speed of the crankshaft.

The timing chain extends around both sprockets and between them in conventional fashion so that at any particular moment of time the chain has a first supported portion 24 engaging the drive sprocket 18, a second supported portion 26 engaging the driven sprocket 20 and first and second runs or unsupported portions 28, 30 which extend between the peripheries of the drive and driven sprockets. As is common in such drive chains where the unsupported portions or runs are of substantial length, undesirable vibration is likely to occur in the chain runs, causing increased wear and possible damage to the chain and sprockets if some means of snubbing, damping or otherwise preventing such vibration is not provided.

The present invention provides the needed chain snubbing function by means of a snubber member generally indicated by numeral 32. Snubber 32 includes a formed sheet metal base portion 34 having a flat center section 36 with upturned upper and lower edges 38, 40, respectively, arranged to stiffen the center section.

Openings 42, 44 are provided in the center section to receive bolts or other fasteners, not shown, for securing the center section against the front face of the engine frame 12. Opening 44 is formed in part by an extending wall portion 46 which is adapted to be received in a suitable counterbored recess of the engine frame or block to properly position the snubber member upon assembly.

The opposite sides of the snubber member are provided with upstanding wall portions 48, 50 formed integrally with the center section and upper and lower edges. Portions 48, 50 in turn support individual nonmetallic guide shoes 52, 54 respectively, which are secured to the outer faces of the wall portions 48, 50.

The outer surfaces of the guide shoes 52, 54 extend in line-to-line nondeflecting contact with the opposed inner sides of the chain runs or unsupported portions 28, 30 over most of their length when they are in their tensioned positions. If desired, a slightly angled lead-in ramp 56 may be provided at the end of the shoe 52 from which the chain moves from the drive sprocket into engagement with the shoe in order to provide for a smooth engagement of the chain with the surface of the shoe.

In operation, rotation of the crankshaft and camshaft sprockets are in clockwise direction as viewed in drawing FIGS. 1 and 2. Thus, the direction of chain movement is upwardly in run 28 and downwardly in run 30, with run 30 carrying the driving load and normally being tensioned and run 28 being the slack side of the chain.

Because of the tension, run 30 is normally held relatively straight and in line-to-line contact with its guide shoe 54. Vibration which might otherwise be set up in this run is prevented by the shoe 54 which allows only outward movement of the chain run from its nominal tensioned drive position and does not permit any movement inward thereof. Thus, oscillation of chain run 30 in a vibrating motion is not possible.

Chain run 28, being the slack side, is of course free to move outwardly from the position of its guide shoe 52. However, in actual practice it is found that the tendency of the slack side of the chain is to be carried inwardly somewhat by the drive sprocket and to try to move in an inward direction. This tendency is prevented by the presence of guide shoe 52, the lead-in ramp 56 of which guides entering portions of the chain off of the adjacent drive sprocket and onto the surface of the shoe.

Oscillation or vibration of the slack side 28 of the chain is prevented as effectively as vibration of the taut side. Since the chain cannot move inwardly from its straight line tensioned position, the freedom to move outwardly does not result in generating vibrational problems. Thus, both runs or unsupported portions of the timing chain are effectively damped or snubbed so that vibration problems do not occur in the timing chain system.

Because of the line-to-line nondeflecting contact positioning of the guide shoes with the chain runs, the chain snubber of the present invention does not place any side loading on either of the chain runs. Rather, it merely passively prevents movement inwardly from their tensioned positions of the chain unsupported portions. Thus, except for light friction caused by unloaded rubbing of the chain links against the guide shoes, the snubber does not increase the drive loading on the chain sprockets. Accordingly, it has little or no effect on their wear life, except as it increases such life by avoiding damaging vibration effects in the chain itself.

Thus, the present invention provides a simple, inexpensively manufactured and easily installed chain snubbing device which effectively prevents chain vibrations and increases component life without adding to drive loading or other problems. Any suitable materials may be used for the various parts of the snubber. In a preferred embodiment it utilizes a bracket or base portion formed of steel with guide shoes molded thereon and formed from a nylon base material, preferably containing molybdenum disulfide, one form of which is available commercially under the tradename Nylatron.

While the invention has been described by reference to a specific embodiment, it should be understood that numerous changes could be made without departing from the inventive concepts disclosed. Accordingly, the invention is not intended to be limited except by the language of the following claims.

What is claimed is:

1. In an internal combustion engine, a frame rotatably supporting a crankshaft and a camshaft in spaced parallel relation, a sprocket mounted on each of said shafts, a timing chain extending around and engaging both of said sprockets for drivably connecting said crankshaft with said camshaft, and the improvement comprising a snubber for limiting vibrations in the unsupported portions of the chain intermediate the sprockets, said snubber comprising guide means fixed with respect to said frame and having a pair of fixed guide surfaces positioned so as to extend in line-to-line nondeflecting contact with the opposed inner sides of the chain unsupported portions over most of their length when in their tightly stretched positions between sprockets, so as to prevent movement of the contacted chain portions inwardly of said tightly stretched positions without affecting movements outwardly thereof.

2. In an internal combustion engine, a frame rotatably supporting a crankshaft and a camshaft in spaced parallel relation, a sprocket mounted on each of said shafts, a timing chain extending around and engaging both of said sprockets for drivably connecting said crankshaft with said camshaft, and the improvement comprising a snubber for limiting vibrations in the unsupported portions of the chain intermediate the sprockets, said snubber comprising a bracket member having a transversely disposed body fixedly attached to said frame between the unsupported chain portions and a pair of chain guide shoes fixedly secured to the body at either side thereof, each shoe having a guide surface positioned so as to extend in line-to-line nondeflecting contact with the opposed inner side of its respective chain unsupported portion over most of its length when in its tightly stretched position between sprockets, so as to prevent movement of the contacted chain portion inwardly of said tightly stretched position without affecting movements outwardly thereof.

3. The combination of claim 2 wherein said bracket member comprises a formed sheet metal body having a flattened center section with upturned edges and a pair of oppositely disposed upturned wall portions, said guide shoes being nonmetallic and fixed to said wall portions.

4. The combination of claim 3 wherein said guide shoes are formed of nylon base material molded on to said upturned wall portions.

* * * * *